Patented Jan. 2, 1940

2,185,356

UNITED STATES PATENT OFFICE 2,185,356

COMPOSITE MATERIAL

Harold F. Robertson, Coraopolis, Pa., assignor, by mesne assignments, to Union Carbide and Carbon Corporation, a corporation of New York No Drawing. Application January 25, 1933, Serial No. 653,484

3 Claims. (Cl. 154—46)

This invention relates to composite materials which include vinyl resin portions together with one or more absorbent or fibrous materials, such as paper, cloth fabrics in general, pulpboard, corkboard and pasteboard.

Vinyl resins, that is, polymerization products of certain vinyl compounds, are known and have been proposed for many uses which include coating and impregnating wood and other fibrous materials both by dry molding, in which the resin is forced into the fibrous structure under pressure while softened by heat, and in applications which utilize solutions of the resins to secure impregnation.

Fibrous sheets, such as paper or cloth, are frequently treated to render them waterproof. If this treatment involves impregnating the fibers with a solution of the waterproofing agent, the fibers are stiffened and the impregnated material has a greatly reduced tear strength due to the cementing together of the fibers. For example, this decreased tear strength may be observed in paper of the glassine type where the fibers have largely lost their identity by gelatinization. The same effect is produced in impregnating fibrous materials with solutions of vinyl resins or with vinyl resins by heat and pressure.

In attempts to overcome this difficulty and to produce waterproof or greaseproof materials, the waterproofing or greaseproofing material has been applied to the fibrous sheet only upon its surface. This has been done in two ways, first, by cementing a suitable impervious sheet to the fibrous base with an adhesive, and second, by applying the coating material as a viscous solution or varnish which does not completely impregnate the base sheet but which merely wets the surface fibers enough to secure anchorage of the coating film.

Both of these methods possess disadvantages in that they require solutions either of the cementing material in the first case or for flowing on the superficial coating layer in the second instance. Where solutions are used, it necessitates drying the coated sheet material and if nonaqueous solvents are used, solvent recovery systems are required for economical operation. The use of non-aqueous solvents additionally involves, as a general rule, hazards to workmen and danger of fire. Also, in both of the expedients shown to avoid the disadvantages of impregnation, the fibers are actually impregnated at least superficially and when such coated fibrous sheets are used for fabricating articles of various kinds, the coating may be loosened or weakened by folding or working and the impervious character of the sheet thereby is more or less lost. Further, especially in the case of the second proposal, every fiber may not be coated in which case an uncoated fiber will act as a wick and the purpose of the treatment will be defeated.

My invention avoids to a large extent the foregoing difficulties, and provides novel benefits. The principal object of the invention is to provide a new and economical process for rendering pervious fibrous sheet materials grease and waterproof. Another object is to provide novel impervious sheet materials comprising vinyl resin coated fibrous sheets.

I have found by experiment that I am enabled to achieve the objects of the invention by applying sheets or films of vinyl resins to pervious fibrous sheet materials employing only heat and pressure to effect the union of the materials. Further, I have discovered, that contrary to expectations, the degree of heat and pressure required for this bonding of the vinyl resin sheet or film to the fibrous base is insufficient to cause any substantial alteration of the structure of the base or any substantial impregnation of the fibers of the base material by the vinyl resin. I have also provided for the continuous production of such coated material.

I prefer first to form a thin sheet or film of vinyl resin which is then firmly bonded to the fibrous base to be treated by heat and pressure. The vinyl resin may be any type thereof which possesses physical properties suitable for this use. For example, vinyl esters generally may be polymerized to form useful resins, and improved vinyl resins may be made by the conjoint polymerization (by which is meant polymerization while in mutual contact) of two or more vinyl compounds. For example, a vinyl halide, such as vinyl chloride, may be conjointly polymerized with a vinyl ester of an aliphatic acid, such as vinyl acetate, propionate, butyrate, etc., to form excellent resins. Vinyl benzene (styrene) may be used with a vinyl ester of an aliphatic acid or other vinyl ester to form useful conjointly polymerized products. In general, I prefer to use products of the conjoint polymerization of a vinyl halide and a vinyl ester of an aliphatic acid which contain about 80% by weight of the vinyl halide for making my new products, an example of such a preferred resin may be a product formed by conjointly polymerizing vinyl chloride and vinyl acetate in the proportions of about 80% by weight of the chloride. The resins may be made by processes such as those disclosed in Patent 2,064,565, dated December 15, 1936.

The film or sheet of vinyl resin which is to be used as the grease or waterproofing agent for a fibrous sheet may be composed of the resin alone or it may contain various modifying additions. For example, plasticizers may be incorporated with the resin. Dibutyl phthalate, glycol and glycol derivative esters of various acids, tricresyl esters, such as tricresyl phosphate, diphenyl derivatives, such as the halogenated products, halogenated naphthalenes and other known softening agents or high-boiling solvents are examples of suitable plasticizers. The amount of plasticizer to be used may be up to about 30% by weight of the vinyl resin, and when the plasticized compositions are formed into thin sheets of films these larger quantities of plasticizer have no tendency to make the film tacky. Increased resistance to moisture may be obtained by incorporating waxes with the resin. Suitable waxes are carnauba wax, paraffin wax, Japan wax, etc., and the amount thereof may be up to about 5% to 10% of the weight of vinyl resin. The amount of pressure and degree of heat required to make the new materials are decreased proportionately by the amount of plasticizer added, also, the vinyl resin, whether plasticized or not, may be colored as desired by the addition of dyes and the like.

I have found that under the same conditions the degree of imperviousness to water vapor imparted to paper, for example, is practically the same whether a sheet of vinyl resin 0.0006 inch thick or one 0.0025 inch thick is used, and for the main part this is also true for the resistance to liquid water and to grease imparted by film of these thicknesses.

The sheets which contain not more than 10% plasticizer and which are less than about 0.003 inch in thickness can be made most economically by extrusion and precipitation of the resin in film form from a solution in accordance with my Patent 2,010,963, Reissue 20,080, dated August 25, 1936. The sheets or films which contain more than about 10% plasticizer or, if desired, sheets or films of any composition may be made by casting a solution of the resin upon a polished flat surface or continuously on a polished wheel.

Since the process of my invention requires but moderate temperatures and comparatively slight pressures it may be carried out continuously by passing the fibrous sheet material to be coated and a sheet or film of vinyl resin together between heated calender rolls. It may, of course, be carried out by pressing the materials to be made into the composite materials between polished platens heated to the desired temperature.

The pressures and temperatures required to effect union of the vinyl resin sheet or film with the fibrous base may vary from 1 pound per square inch at a temperature of 70° C. for bonding paper and a vinyl resin sheet containing 15% by weight of dibutyl phthalate, to about 20 to 30 pounds per square inch at a temperature of 100° to about 140° C. for uniting paper and a sheet of unmodified vinyl resin.

The invention will be illustrated by the following examples:

I. A vinyl resin was prepared by the conjoint polymerization of vinyl chloride and vinyl acetate with the aid of dibenzoyl peroxide as a catalyst at a temperature of about 30° C. The resin contained about 83% by weight of vinyl chloride. This resin was dissolved in acetone together with 15% of its weight of dibutyl phthalate and a film 0.001 inch in thickness was made by casting this solution of resin and plasticizer on a polished plate of glass. The film so formed was then placed over a sheet of light cardboard carton stock and the assembly was pressed between polished platens heated electrically to about 70° C. and to which a pressure of 1 to 2 pounds per square inch was applied. The laminated stock was tested and found to be impervious to grease, oil and water. The fibers of the cardboard were not cemented by the resin, and the pressure used did not alter the structure or density of the cardboard. The adhesion of the resin layer to the cardboard was excellent and the bond was as strong as the main portion of the material. Even when the laminated material was sharply folded by creasing the fold under considerable pressure it was found that no oil, grease or water penetrated the fold after several hours contact therewith.

II. A vinyl resin made as in Example I, was dissolved in acetone and the solution was extruded into a precipitating bath by the process diclosed in my Reissue Patent 20,080 to form a clear film of the resin about 0.0006 inch in thickness. This film was then dry pressed against paper, cloth, pulpboard and the like at temperatures of about 100° to 140° C. and with pressure of about 20 to 30 pounds per square inch to form composite materials. These composite materials were tested and found to be impervious to grease and water, and were flexible and sufficiently firmly bonded to permit fabrication of boxes, cartons and the like therefrom, and, in general satisfactory as in the tests described in the preceding example.

Films 0.0024 inch in thickness were also prepared from the same vinyl resin by the same procedure and used for making similar composites. In each case the degree of imperviousness imparted to the base material was substantially the same as that imparted by the resin film 0.0006 inch thick.

III. A vinyl resin film 0.0008 inch in thickness produced as in Example II and which contained no plasticizer was joined to a printed cotton fabric. The union was effected under a pressure of 250 pounds per square inch at a temperature of 120° C. The bond was strong and firm and the resin did not strike through or substantially impregnate the fabric.

The same type of vinyl resin film was also used to render impervious cotton balloon cloth. The union was effected under a pressure of 200 pounds per square inch at a temperature of 130° C. The cloth was firmly bonded with the vinyl resin film and the resin did not substantially impregnate the fabric.

IV. Five pieces of vinyl resin film 0.001 inch in thickness produced as in Example II were placed over cardboard stock. The entire assembly was then pressed at 130° C. with a pressure of about 500 pounds per square inch. This produced a laminated board covered with and firmly bonded to a continuous vinyl resin film approximately 0.004 inch in thickness.

V. The vinyl resin film does not necessarily form an outer surface of the laminated object. For example, a piece of vinyl resin film 0.001 inch in thickness and made as in Example II was placed between two pieces of paper, and the whole was pressed at 120° C. with a pressure of 250 pounds per square inch. The resulting product had less tendency to curl with changes in humidity than has untreated paper, and the transmission of grease and water through the product is greatly decreased if not eliminated by the presence of the vinyl resin lamination. Also, if the two pieces of paper are placed with their machine directions at right angles, the tear strength of the composite is the same in all directions.

The economy of my new material will be evident from the fact that thin films of the vinyl resin coating are satisfactory, and in fact, twenty square yards of paper, pulpboard, etc., may be adequately covered with a single pound of vinyl resin in film form. This coverage is much greater than if the resin were used to impregnate the materials, and produces a much better product than if the same coverage were obtained by applying the resin in solution as a lacquer or varnish. As before mentioned, other economies are derived from the absence of solvents and drying equipment in the process of this invention.

I claim:

1. Composite material comprising a pervious base sheet of fibrous material coated to render it substantialy greaseproof and waterproof on at least one surface by a smooth, continuous, impervious, preformed film of vinyl resin composition having a thickness from about 0.0006 inch to about 0.001 inch in which the vinyl resin is substantially identical with a resin resulting from the conjoint polymerization of a vinyl halide with a vinyl ester of a lower aliphatic acid and containing about 80% by weight of vinyl halide, said surface of the base sheet and said vinyl resin-containing film being firmly bonded in permanently fused union so that said resin does not strike through or substantially impregnate said base sheet, in the absence of a solvent for such resin, by heat and pressure at a temperature below about 130° C. and at a pressure not more than about 250 pounds per square inch, and said base sheet being unaltered in its fibrous structure.

2. Composite material comprising a pervious base sheet of fibrous material coated to render it substantially greaseproof and waterproof on at least one surface by a smooth, continuous, impervious, preformed film of vinyl resin composition having a thickness from about 0.0006 inch to about 0.001 inch in which the vinyl resin is substantially identical with a resin resulting from the conjoint polymerization of vinyl chloride with vinyl acetate in the proportions of about 80% by weight of vinyl chloride, said surface of the base sheet and said vinyl resin-containing film being firmly bonded in permanently fused union so that said resin does not strike through or substantially impregnate said base sheet, in the absence of a solvent for such resin, by heat and pressure at a temperature below about 130° C. and at a pressure not more than about 250 pounds per square inch, and said base sheet being unaltered in its fibrous structure.

3. Composite material comprising a pervious base sheet of fibrous material coated to render it substantialy greaseproof and waterproof on at least one surface by a smooth, continuous, impervious, preformed film having a thickness from about 0.0006 inch to about 0.001 inch of a composition containing a vinyl resin substantially identical with a resin resulting from the conjoint polymerization of vinyl chloride with vinyl acetate in the proportions of about 80% by weight of vinyl chloride, together with a plasticizer in an amount up to 30% by weight of the resin and a wax compatible with said resin in an amount less than 10% by weight of the resin, said surface of the base sheet and said vinyl resin-containing film being firmly bonded in permanently fused union so that said resin does not strike through or substantially impregnate said base sheet, in the absence of a solvent for such resin, by heat and pressure at a temperature below about 130° C. and at a pressure not more than about 250 pounds per square inch; and said base sheet being unaltered in its fibrous structure.

HAROLD F. ROBERTSON.